United States Patent [19]

De Wit

[11] Patent Number: 4,708,287

[45] Date of Patent: Nov. 24, 1987

[54] APPARATUS FOR ADJUSTING A CENTRAL HEATING INSTALLATION

[75] Inventor: Jan B. De Wit, Apeldoorn, Netherlands

[73] Assignee: Nederlandse Centrale Organisatie voor Toegepast-Natuurwe-Tenschappelijk Onderzoek, Netherlands

[21] Appl. No.: 811,949

[22] Filed: Dec. 20, 1985

[30] Foreign Application Priority Data

Dec. 24, 1984 [NL] Netherlands .......................... 8403945

[51] Int. Cl.$^4$ .......................... F24D 3/00; F24D 19/10
[52] U.S. Cl. ..................................... 237/8 R; 236/91 F
[58] Field of Search ............... 237/8 R, 8 C; 236/9 A, 236/91 F, 1 B, 37; 374/40, 41, 39; 364/505, 506, 509

[56] References Cited

FOREIGN PATENT DOCUMENTS

A0063530 10/1982 European Pat. Off. .

OTHER PUBLICATIONS

Caldwell et al., "Flow Balance in Hydronic Systems" Air Conditioning, Heating & Ventilating, pp. 71-98, Sep. 1965.

Primary Examiner—Henry A. Bennet
Attorney, Agent, or Firm—Brumbaugh, Graves, Donohue & Raymond

[57] ABSTRACT

Apparatus for adjusting a central heating installation, particularly in respect of the heat delivery of the appertaining radiator or radiators separately, for which purpose the or each radiator is provided with a presettable valve in the supply pipe for the heating medium, such as water. The apparatus is further provided with a temperature transducer on the supply pipe and a temperature transducer on the return pipe for the heating medium, and a control unit is provided which has at least three inputs, to two of which said temperature transducers of the supply and return pipes are connected, while to the third said input a room temperature transducer is connected. Said control unit comprises a memory for storing the relationship between the relative heat delivery of the radiator and the relative mass flow of the heating medium, using as parameters the differences between supply, return and room temperatures and the heat delivery exponent of the radiator, and for storing input data, measured temperatures and calculated heat delivery, said control unit reacting to the measured temperatures to supply at the output a control signal for indication and/or valve adjustment of the mass flow in the flow pipe.

8 Claims, 5 Drawing Figures

Fig-1 fig-3a fig-3b

APPARATUS FOR ADJUSTING A CENTRAL HEATING INSTALLATION

The invention relates to an apparatus for adjusting a central heating installation, particularly in respect of the heat delivery of the appertaining radiator or radiators separately, for which purpose the radiator in question is provided with a presettable valve in the supply pipe for the heating medium, such as water.

This valve is generally provided with facilities for adjustment. This controls the amount of water flowing through the radiator for a determined pressure drop with the valve fully open. Through this "adjustment" it is possible to achieve a distribution of the amount of water through the radiators in conformity with the nominal capacities, while the detrimental influence of the opening and closing or radiators on this distribution, also known as hydraulic balance, is restricted. An apparatus of this kind is known in which the adjustable valve is in the form of a thermostatic valve which reacts to the room temperature to close the supply pipe more or less completely. Thermostatic valves of this kind, however, need adjustment just as much in practice in order to enable the hydraulic balance to be maintained.

In practice it has been found that it is of great importance that a central heating installation should be adjusted not only when it is first put into service, but also periodically during use. In practice good adjustment is even frequently omitted at the commencement of operation, because the installer often does not have the time and/or the knowledge to adjust the installation correctly. In addition, transmission calculations for the central heating installation are generally of a global nature, and in practice insufficient attention is also paid to the desired temperature distribution in a house or building. Moreover, outside conditions, that is to say outdoor temperature and wind, at the time when the adjustment is made may differ from the conditions for which the installation is designed.

The invention seeks to overcome the problems explained above and to provide an apparatus with the aid of which in practice accurate and rapid adjustment of a central heating installation can be achieved when it is first put into operation and periodically thereafter as necessary.

With an apparatus of the kind first defined above this is according to the invention achieved with the aid of a temperature transducer on the supply pipe and a temperature transducer on the return pipe of the radiator, and of a control unit having at least three inputs, to two of which said temperature transducers of the supply and return pipes for the heating medium are connected, while to the third said input a room temperature transducer is connected, said control unit having a memory for storing the relationship between the relative heat delivery of the radiator and the relative mass flow of the heating medium, using as parameters the differences between supply, return and room temperatures and the heat delivery exponent of the radiator, and for storing input data, measured temperatures and calculated heat delivery, and said control unit reacting to the measured temperatures to supply at the output a control signal for indication and/or valve adjustment of the mass flow in the supply pipe.

An apparatus of this kind can with particular advantage be so constructed that the output of the control unit is electrically connected to said valve. With the aid of a valve motor, said control signal can open or close the valve to a greater or lesser extent for the purpose of so adjusting the mass flow of the heating medium that the desired indoor temperature, the nominal mass flow or the desired heat delivery is achieved.

In the memory of a control unit of this kind series of data relating to relative heat output, relative mass flow, supply temperature, return temperature, desired ambient or room temperature, and the respective heat delivery exponent of the radiator or radiators are stored in their mutual operating relationship.

The heat delivery Q (in kJ or kW) of a heating unit or radiator depends in fact substantially on:
  the rated radiator power or capacity c (in kW), which is the heat delivery under nominal conditions, and the heat delivery exponent m of the radiator;
  the supply temperature $T_a$ (in °C.) of the heating medium, and the ambient or room temperature $T_{bi}$ (in °C.), and
  the mass flow $\phi_m$ (in kg/s) of the heating medium.

The return temperature $T_r$ of the heating medium follows as derived quantity from the above quantities.

Under non-stationary conditions, which occur when the characterizing quantities of the radiator, such as supply, return and surface temperature change with time, the heat delivery does not follow unequivocally from the said quantities, but is also determined by the surface temperature of the radiator. In case the central heating installation has to be adjusted under such non-stationary conditions a surface temperature transducers on the radiator has to be connected to the control unit.

The mutual relationship of the above important influencing factors is known in the art in the form of a general operating diagram; see for example the article "Das Leistungsverhalten von Raumheizkörpern in grafischer Darstellung" in "Haustechnische Rundschau", Heft 10, 1974, page 220–230.

In the designing of central heating installations the basis used is frequently the well known 90/70 operation, that is to say $T_a$ (supply)=90° C. and $T_r$ (return)=70° C. under design conditions (for example $T_{bu}$ (outdoor)= −10° C.). On this basis the nominal mass flow or delivery $\phi_{m,n}$ can be determined for each radiator. These mass flows are the basis for calculation of the piping system. If the piping system is correctly calculated and installed, the nominal mass flow $\phi_{m,n}$ can be provided for each radiator by preadjustment of the radiator valves.

As operation continues it may then be found in practice that the nominal mass flow $\phi_{m,n}$ obtained for each radiator does not immediately lead to a satisfactory result, that is to say the room temperature obtained does not immediately coincide with the desired room temperature. In this case the mass flow must be corrected so that the heat delivery coincides with heat requirements. The mass flow $\phi_m$ must therefore be increased or reduced in relation to $\phi_{m,n}$ by further adjustment. With a central heating installation which is well adjusted on the basis of 90/70 operation and also of the prevailing outdoor temperature, it will finally be possible to indicate the desired room temperature, the room temperature attained and how high the return temperature must be to obtain the desired room temperature with a given supply temperature.

The invention will be further explained with the aid of an example of embodiment and with reference to the drawings, in which.

Figure 1:
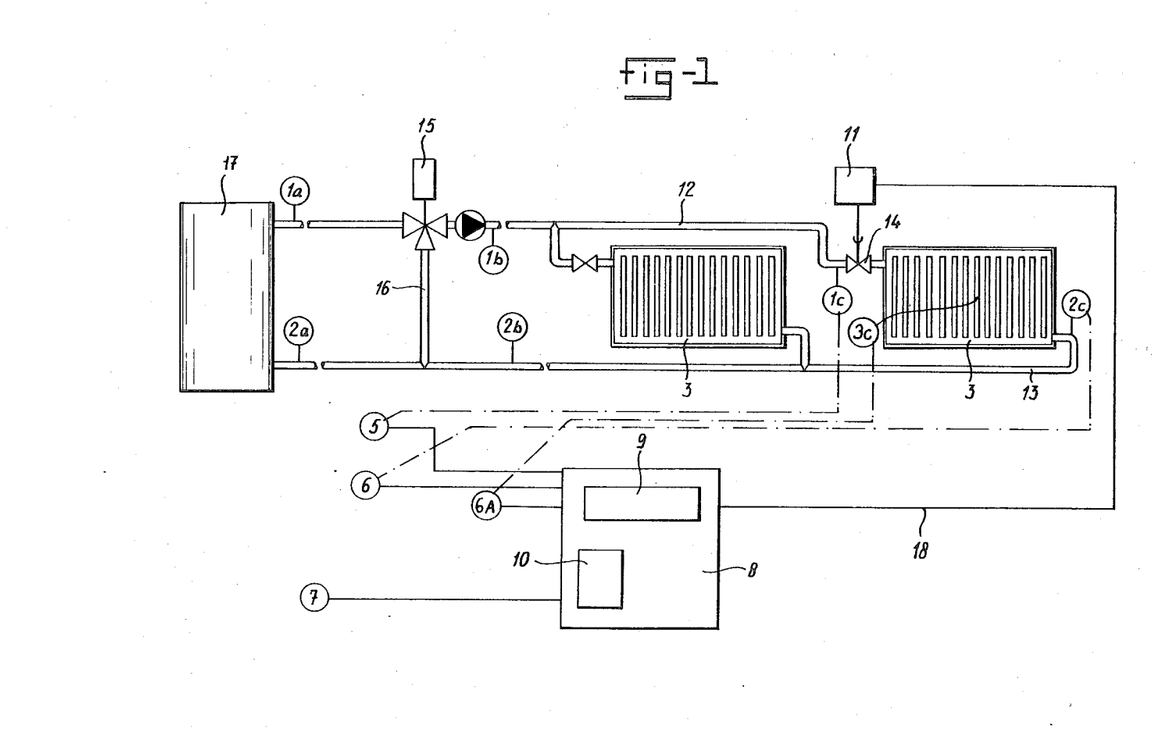
FIG. 1 is a diagram of one example of construction of the apparatus according to the invention.

The adjusting apparatus shown in FIG. 1 comprises a control unit 8 to which data can be input by means of a keyboard 10 and from which data can be read out by means of display means 9. The control unit 8 is provided externally with three temperature transducers for measuring:

the supply water temperature $T_a$,
the return water temperature $T_r$,
the indoor or outdoor temperatures $T_{bi}$ and $T_{bu}$ respectively.

Such as mentioned before a surface temperature transducer 6A can be connected to the apparatus for the purpose of adjustment under non-stationary conditions. This transducer measures the surface temperature $T_s$ of the radiator.

For the purpose of adjustment of a separate heating unit (radiator) 4, a supply pipe 12 containing a valve 14 and a return pipe 13 are connected thereto. With the aid of the temperature transducers 5, 6 respectively the supply temperature $T_a$ of the heating medium is measured at the point 1c in the pipe 12 and the return temperature $T_r$ of the heating medium is measured at the point 2c in the pipe 13. If required the surface temperature $T_s$ of the radiator is measured with the aid of temperature transducer 6a at the point 3c. The supply and return pipes 12, 13, respectively are connected to a central heating boiler 17 with the interposition of a threeway valve 15 and a bypass pipe 16. With the aid of another room temperature transducer 7 the outdoor temperature $T_{bu}$ (mode K2) or the indoor (room) temperature $T_{bi}$ (mode K3, K4, K5 or K6) is measured. For the purpose of adjusting the primary circuit (upstream of the threeway mixing valve 15) the temperature transducers 5 and 6 can be placed respectively at the points 1a and 2a. For the purpose of adjustment of a group of radiators (downstream or the threeway mixing valve) the temperature transducers 5 and 6 should be placed at the points 1b and 2b respectively. This adjustment of the primary circuit and radiator group relates particularly to adjustment of the circulating pump or pumps and strang adjustment valves.

For the purpose of adjustment of separate radiators the temperature transducers 5 and 6 should be placed at the points 1c and 2c respectively and the surface temperature transducer 6a at the point 3c.

With the aid of the keyboard, for example, the nominal power $Q_n$ of the radiator, the nominal mass flow $\phi_{m,n}$ of the heating medium, the design supply temperature $T_{a,o}$ and design return temperature $T_{r,o}$, and also the design outdoor temperature $T_{bu,o}$, the desired room temperature $T_{bi,g}$, and various temperature limits can be input. On the basis of the data input and the quantities measured, either information is displayed by the control unit on the display means in connection with the desired manual adjustment of the valve 11 or the latter is adjusted direct by the control unit with the aid of an actuator 11.

Figure 2:
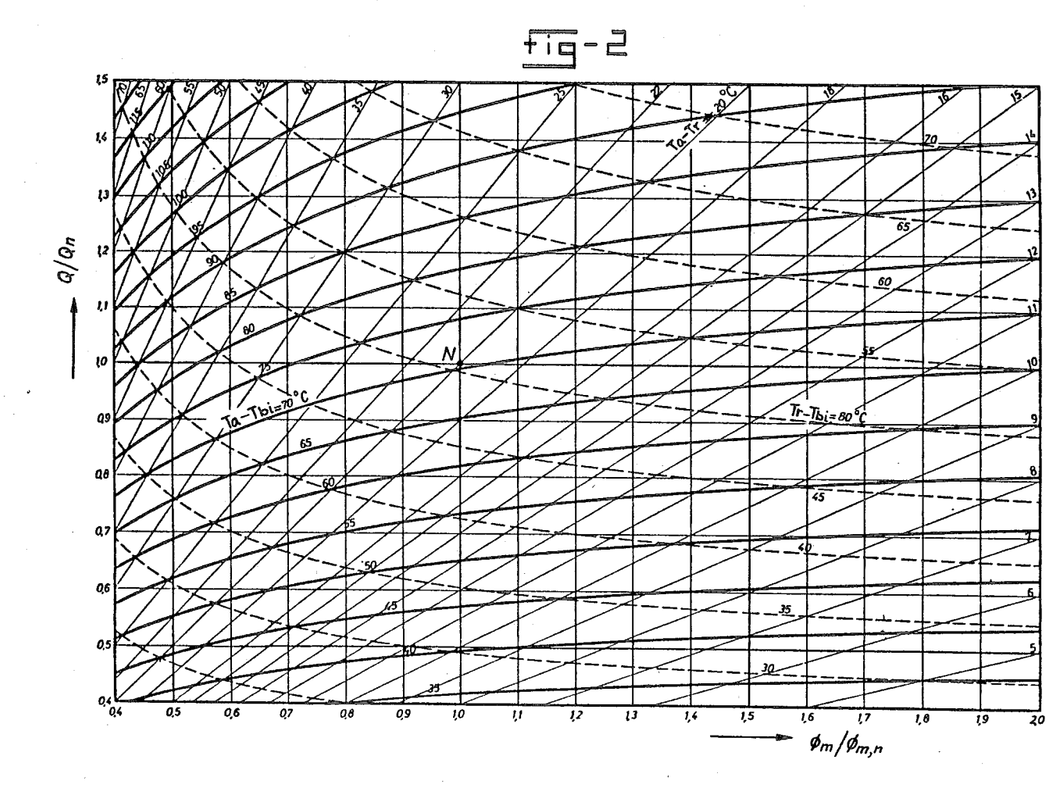
FIG. 2 gives an example of a generally applicable operating diagram of the quantities concerned.

FIG. 2 shows the operating diagram applicable to normal radiators (m=1.3). The (dimensionless) relative mass flow $\phi_m/\phi_{m,n}$ is here shown horizontally, and the (dimensionless) relative heat delivery $Q/Q_n$ vertically. The difference between the supply temperature $T_a$ and the room (air) temperature $T_{bi}$ together with the relative mass flow $\phi_m/\phi_{m,n}$, determine the relative heat delivery $Q/Q_n$ and the return temperature $T_r$ in the stationary state.

The following example is given to illustrate the action.

Let the supply temperature $T_a$ be 75° C. and the return temperature $T_r$ be 65° C., while the room temperature $T_{bi}$ is equal to 25° C. This means: $\phi_m/\phi_{m,n}=1.38$. Nominal regulation provides that $\phi_m/\phi_{m,n}$ should be equal to 1. This corresponds to a return temperature $T_{r,g} \approx 62°$ C. This $T_{r,g}$ is calculated by the control unit and in addition on the basis of the difference $T_r - T_{r,g}$ an adjustment signal is calculated which is either displayed or is used to control the actuator 11 on the radiator valve 14. This example also shows that nominal adjustment does not necessarily lead to the desired room temperature of 20° C. This can be caused by too high a supply temperature or by incorrect dimensions of the radiator.

The adjustment device deals with this in two ways:

Centrally: Adaptation of the supply temperature centrally so that the radiators have, with nominal adjustment, a heat delivery such that the desired room temperature is achieved.

Decentralized: Adjustment on the basis of room temperature. This means that the mass flow is modified so that the desired room temperature of for example 20° C. is reached.

Central adaptation will be desirably only when all the rooms are too hot or too cold with nominal adjustment, while decentralized adaptation is applied where temperature requirements vary from the design temperatures and/or the radiators are of incorrect dimensions.

The adjustment of an ordinary central heating installation can now generally be effected by the adjusting apparatus in three phases:

Phase 1: initialization (K1, K2),
Phase 2: nominal adjustment (K3, K6),
Phase 3: fine adjustment (K4 and/or K5).

In phase 1 at least the operating temperatures in accordance with design conditions are fed into the control unit, for example $T_{a,o}=90°$ C., $T_{r,o}=70°$ C., and the desired room temperature $T_{bi,g}=20°$ C. The outdoor temperature $T_{bu}$ is then measured with the aid of a separate outdoor temperature transducer, for example $T_{bu}=0°$ C. The control unit thereupon indicates the adjustment point for the supply temperature, for example $T_a=60°$ C., and the corresponding adjustment point for the return temperature, for example $T_r=50°$ C. With the aid of these adjustment points given by the control unit, the temperature setting of the boiler of the central heating installation and/or the setting of the circulation pump or pumps are adjusted.

In phase 2 the control unit verifies, on the basis of the given supply temperature $T_a$, what the return temperature $T_r$ must be under nominal conditions. For this purpose the presettable valve 14 is set manually or by a control signal on the connection 18, while the return temperature is also continuously measured. This adjustment is continued until the required return temperature $T_r$ is measured. For the various radiator groups it must now be verified whether the same supply temperature $T_a$ and the return temperature $T_r$ required in accordance with the operating diagram are measured everywhere. The nominal adjustment of the entire system has thus been completed.

After stabilization of the room temperature, these temperatures are measured at different points. If on the average these temperatures are definitely below or above the mean design temperature, fuel line adaptation is necessary (phase 1). The fuel line is adjusted in such a manner that the mean room temperature coincides with the mean design temperature.

After the fuel line has been correctly adjusted and all the radiators have been given the nominal adjustment, any differences which may occur between the actual room temperatures and the design or desired temperatures are corrected by means of the presettable valve 14.

Figure 3A:
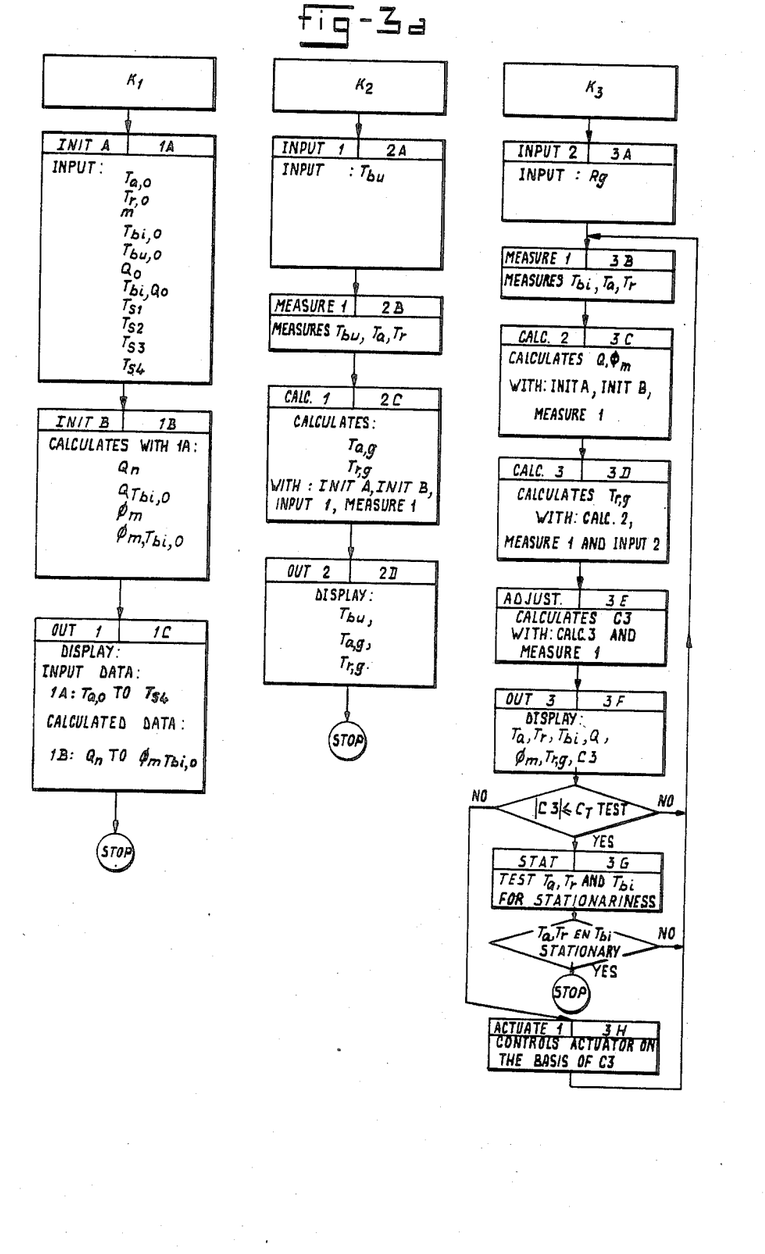
FIGS. 3a, 3b, 3c shows flow diagrams showing the action of the adjusting apparatus shown in FIG. 1.
Figure 3B:
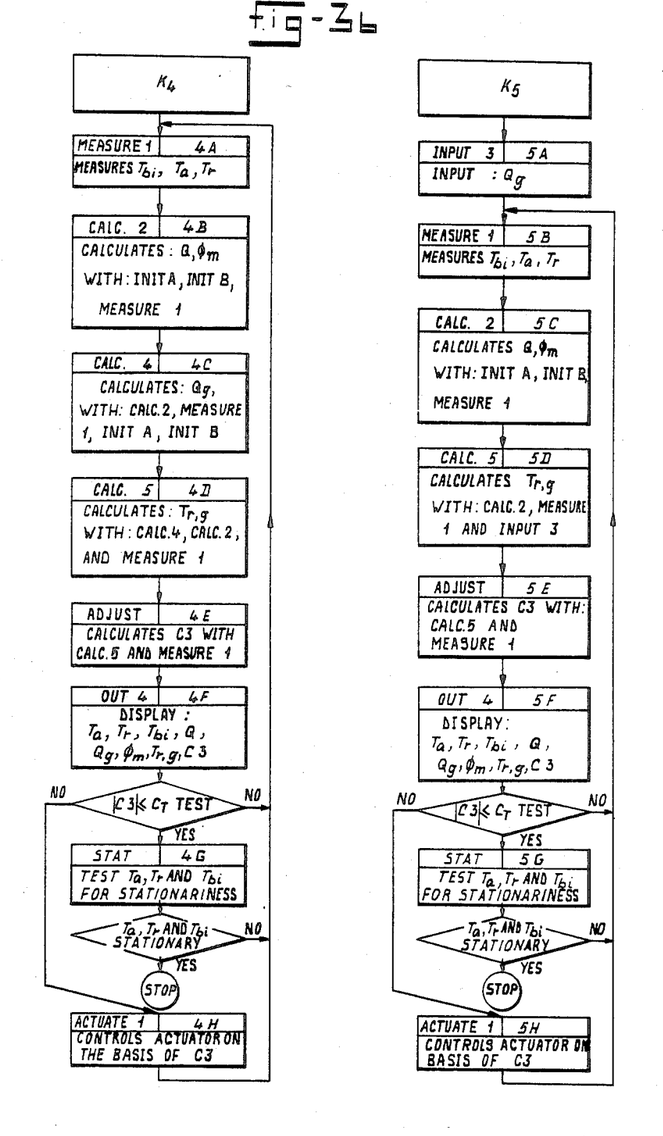
Figure 3C:
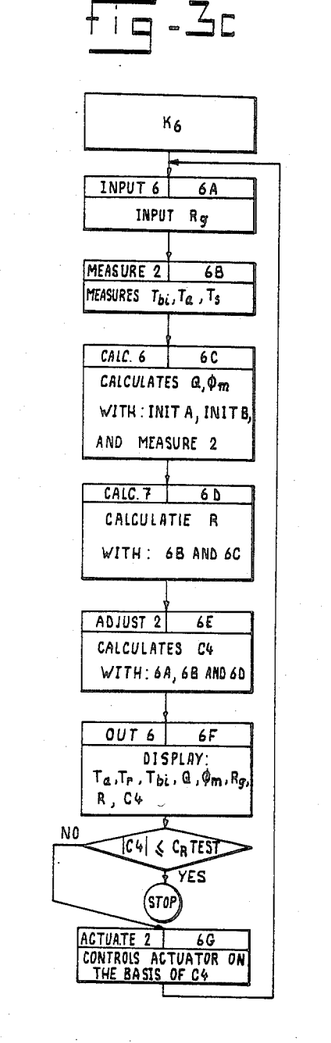

FIG. 3 shoss a flow diagram of the control apparatus. With the aid of the buttons K1 to K6 one of the following operating states or modes is selected. The modes K3 tot K6 can be separately selected and utilized after the original initialization.

Mode K1: Initializes the operation of the apparatus. When the apparatus is switched on, it starts automatically in mode K1.

Module 1A: the following must be input:

| | |
|---|---|
| design flow temperature | $T_{a,o}$ |
| design return temperature | $T_{r,o}$ |
| heat delivery exponent | m |
| design indoor temperature | $T_{bi,o}$ |
| design outdoor temperature | $T_{bu,o}$ |
| design radiator power | $Q_o$ |
| indoor temperature, associated with $Q_o$ | $T_{bi,Qo}$ |
| Fuel line parameters: | |
| outdoor temperature lower limit | $T_{S1}$ |
| (= "design outdoor temperature") | |
| outdoor temperature upper limit | $T_{S2}$ |
| supply temperature lower limit | $T_{S3}$ |
| supply temperature upper limit | $T_{S4}$ |

In module 1A the most important installation parameters are thus demanded. The user must input these parameters to the control unit 8 by means of the keyboard 10.

Module 1B: calculates from module 1A:

| |
|---|
| the radiator power at $T_{a,o}$, $T_{r,o}$ and $T_{bi}$ = 20° C. $Q_n$ |
| the radiator power at $T_{a,o}$, $T_{r,o}$ and $T_{bi,o}$ $Q_{Tbi,o}$ |
| the nominal mass flow, associated with $Q_n$ $\phi_{m,n}$ |
| the nominal mass flow, associated with $Q_{Tbi,o}$ $\phi_{m,Tbi,o}$ |

Module 1C: displays the input data $T_{a,o}$ ... $T_{S4}$ and the calculated quantities $Q_n$ ... $\phi_m$, $T_{bi,o}$ on the display means and stores them in a memory for the purposed of modes K2 to K6.

Mode K2: calculates the desired supply and return temperatures on the basis of data input and stored, and also calculations from mode K1.

Module 2A: in this module it must be indicated whether the outdoor temperature ($T_{bu}$) is to be measured or input. If inputting is selected, $T_{bu}$ is input to this module 2A.

Module 2B: if measurement of the outdoor temperature $T_{bu}$ is selected, this temperature and also the supply and return temperatures $T_a$ and $T_r$ are measured in module 2B.

Module 2C: calculates the desired supply and return temperatures $T_{a,g}$ and $T_{r,g}$ with 2A, 2B, 1A and 1B.

Module 2D: displays the prevailing outdoor temperature $T_{bu}$, the desired supply and return temperatures $T_{a,g}$ and $T_{r,g}$ on the display means.

Mode K3: Calculates the desired return temperature $T_{r,g}$ and the relative deviation $C_3$ from the actual return temperature, together with the correction to the presetting of the valve, on the basis of the input desired mass flow (in relation to the nominal mass flow $\phi_{m,n}$) and the measured values $T_{bi}$, $T_a$, and $T_r$.

Module 3A: the desired mass flow ratio $R_g$ ($\phi_{m,g}/\phi_{m,n}$) must be input to this module.

Module 3B: measures the indoor temperature $T_{bi}$ and the supply and return temperatures $T_a$ and $T_r$.

Module 3C: calculates the actual output power Q and the mass flow $\phi_m$ of the radiator from 3B, 1A and 1B.

Module 3D: calculates the desired return temperature $T_{r,g}$ from 3A, 3B and 3C.

Module 3E: calculates the relative difference $C_3$ between the desired and the actual return temperatures (=$(T_r - T_{r,g})T_{r,g}$) from 3A, 3B and 3D.

Module 3F: displays on the display means (or prints) the supply temperature $T_a$, the return temperature $T_r$, the indoor temperature $T_{bi}$, the actual output power Q, the mass flow $\phi_m$, the desired return temperature $T_{r,g}$ and $C_3$ (see module 3E).

Test, 3G, stationary and 3H modules. If the absolute value of $C_3$ is higher than a determined adjusted threshold value $C_{T.test}$ (T means temperature), the procedure 3B to 3F is repeated. If the apparatus is provided with an actuator 11, this is operated on the basis of $C_3$ through the module 3H. If $C_3$ is lower than or equal to $C_{T.test}$, the values $T_a$, $T_r$ and $T_{bi}$ are tested for stationariness. If this is the case, the adjustment procedure is terminated. If it is not the case, the procedure 3B to 3G is repeated.

Mode K4: Calculates the desired return temperature $T_{r,g}$ and the relative deviation $C_3$ from the actual return temperature, as well as the correction of the presetting of the valve, on the basis of the difference between the actual indoor temperature $T_{bi}$ and the desired indoor temperature $T_{bi,g}$.

Module 4A: measures the indoor temperature $T_{bi}$ and the supply and return temperatures $T_a$ and $T_r$.

Module 4B: calculates the actual output power Q and the mass flow $\phi_m$ of the radiator from 4A, 1A and 1B.

Module 4C: calculates the desired radiator power $Q_g$ from 4B and the difference between the desired indoor temperature $T_{bi,g}$ and the actual indoor temperature $T_{bi}$.

Module 4D: calculates the desired return temperature $T_{r,g}$ from 4A, 4B, and 4C.

Module 4E: calculates the relative difference $C_3$ between the desired and the actual return temperatures (=$(T_r - T_{r,g})/(T_{r,g})$) from 4A and 4D.

Module 4F: displays on the display means (or prints) the supply temperature $T_a$, the return temperature $T_r$, the indoor temperature $T_{bi}$, the actual output power Q, the desired power $Q_g$, the mass flow $\phi_m$, the desired return temperature $T_{r,g}$, and $C_3$ (see module 3E).

Test, 4G, stationary and 4H modules: if the absolute value of $C_3$ is higher than a determined adjusted threshold value $C_{T.test}$ the procedure 4A to 4F is repeated. If the apparatus is provided with an actuator 11, this is operated on the basis of $C_3$ through the module 4H. If $C_3$ is lower than or equal to $C_{T.test}$, the values $T_a$, $T_r$ and $T_{bi}$ are tested for stationariness. If this is the case, the adjustment procedure is terminated. If it is not the case, the procedure 4A to 4G is repeated.

Mode 5K: Calculates the desired return temperature $T_{r,g}$ and the relative deviation $C_3$ from the actual return temperature, as well as the correction of the presetting of the valve, on the basis of the input desired power $Q_g$ of the radiator.

Module 5A: the desired power $Q_g$ of the radiator must be input in this module.

Module 5B: measures the indoor temperature $T_{bi}$ and the supply and return temperatures $T_a$ and $T_r$.

Module 5C: calculates the actual output power Q and the mass flow $\phi_m$ of the radiator from 5B, 1A and 1B.

Module 5D: calculates the desired return temperature $T_{r,g}$ from 5A, 5B and 5C.

Module 5E: calculates the relative difference $C_3$ between the desired and the actual return temperature $(=(T_r-T_{r,g})/T_{r,g})$ from 5B and 5D.

Module 5F: displays on the display means (or prints) the supply temperature $T_a$, the return temperature $T_r$, the indoor temperature $T_{bi}$, the actual output power Q, the desired power $Q_g$, the mass flow $\phi_m$, the desired return temperature $T_{r,g}$ and $C_3$ (see module 3E).

Test, 5C, stationary and 5H modules: if the absolute value of $C_3$ is higher than a determined adjusted threshold value $C_{T.test}$, the procedure 5B to 5F is repeated. If the apparatus is provided with an actuator 11, this is operated on the basis of $C_3$ through the module 5H. If $C_3$ is lower than or equal to $C_{T.test}$, the values $T_a$, $T_r$ and $T_{bi}$ are tested for stationariness. If this is the case, the adjustment procedure is terminated. If is is not the case, the procedure 5B to 5G is repeated.

Mode K6: Calculates the mass flow through the radiator under non-stationary conditions, as well as the correction of the presetting of the valve, on the basis of the input desired mass flow (in relation to the nominal flow $\phi_{m,n}$) and the measured values $T_{bi}$, $T_a$, $T_r$ and $T_s$.

Module 6A: in this module the desired mass flow ratio $R_g(=\phi_m/\phi_{m,n})$ is to be input.

Module 6B: measures the indoor temperature $T_{bi}$, the supply and return temperatures $T_a$ and $T_r$, and the radiator surface temperature $T_s$ as well.

Module 6C: calculates the actual output power Q and the actual mass flow $\phi_m$ from 6B, 1A and 1B.

Module 6D: calculates the actual mass flow ratio R $(\phi_m/\phi_{m,n})$ from 6B and 6C.

Module 6E: calculates the relative difference $C_4$ between the desired and the actual mass flow ratios $(=(R-R_g)/R_g)$ from 6A, 6B and 6D.

Module 6F: displays on the display means (or prints) the supply temperature $T_a$, the return temperature $T_r$, the indoor temperature $T_{bi}$, the actual output power Q, the mass flow $\phi_m$ and the desired ($R_g$) and actual (R) mass flow ratio, and the relative difference herebetween ($C_4$) as well.

Module 6G: controls the actuator 11 on the basis of the absolute value of $C_4$. If $C_4$ is lower than or equal to a determined threshold value $C_{R.test}$, the adjustment procedure is terminated. If it is not the case, the procedure 6A to 6F is repeated.

N.B. The following modules are identical:
Modules 2B, 3B, 4A and 5B.
Modules 3C, 4B and 5C.
Modules 4D and 5D.
Modules 3E, 4E and 5E.
Modules 4F and 5F.
Modules 3G, 4G and 5G.
Modules 3H, 4H and 5H.
Modules 3A and 6A.

I claim:

1. Apparatus for adjusting a central heating installation particularly with respect to the heat delivery of associated radiators which are connected to a central heating source by means of supply and return pipes for a heating medium, the supply pipe including a valve control means comprising first and second temperature transducer means for measuring the supply and return temperature of the medium respectively, a third temperature transducer means for measuring room temperature, a control unit having at least three input terminals supplied with inputs from the first, second and third transducer means, respectively, said control unit including calculating means and memory means for storing the relationship between the relative heat delivery of the radiator and the relative mass flow of the heating medium using as parameters the differences between supply, return and room temperatures and the heat delivery characteristics of the radiator and for storing input data, measured temperatures and calculated heat delivery, the control unit reacting to the input signals and the memory information for providing a control signal to an indicating means and/or to said valve control means for adjusting the flow of the heating medium into the radiator.

2. Apparatus according to claim 1 characterized in that for initialization (K2) there are included means for calculating desired supply and return temperatures, and means for inputting to the control unit, the outdoor temperature, the supply and return temperatures, and said desired supply and return temperatures.

3. Apparatus according to claim 2 characterized in that for nominal adjustment (K3), there are included means for inputting to the control unit the desired relative mass flow of the radiator, the indoor temperature and the supply and return temperatures, means for calculating the output power and mass flow of the radiator, and means for calculating the relative difference between the actual and the desired return tempertures for use for manual or automatic adjustment of said valve by display or transmission of a control signal.

4. Apparatus according to claim 2 characterized in that for fine adjustment (K4) there are included means for inputting to the control unit the indoor temperature and the supply and return temperatures, and means for calculating the output power and the mass flow of the radiator, means for calculating the desired radiator power and the desired return temperature, and means for calculating the relative difference between the actual and desired return temperatures for use for manual or automatic adjustment of said valve by display or transmission of a control signal.

5. Apparatus according to claim 2 characterized in that for fine adjustment (K5) there are included means for inputting to the control unit the desired power of the radiator, the indoor temperature and the supply and return temperatures, means for calculating the output power and mass flow of the radiator, means for calculating the desired return temperature, and means for calculating the relative difference between the actual and desired return temperatures for use for manual or automatic adjustment of said valve by display or transmission of a control signal.

6. Apparatus according to claim 2 characterized in that for nominal adjustment (K6) under non-stationary conditions, there are included means for inputting to the control unit the desired relative mass flow of the radiator, the indoor temperature, the supply and return temperatures and the radiator surface temperature, and means for calculating the output power and mass flow of the radiator, and means for calculating the relative difference between actual and desired mass flow for use for manual or automatic adjustment of said valve by display or automatic transmission of a control signal.

7. Apparatus according to claims 3, 4, 5 or 6 wherein the valve is provided with an acutator, and there are included means for comparing the relative return temperature difference with a test value and when such value is exceeded, repeating the measurements and calculations for deriving a control signal for control of said actuator on the basis of the relative return temperature difference until such difference is smaller than the test value.

8. Apparatus according to claim 7 further characterized in that there are included means for testing for stationariness the supply, return and indoor temperatures when the relative return temperature difference is lower than the test value, and means for repeating the aforesaid measurements, calculations, control and testing until they are stationary.

* * * * *

UNITED STATES PATENT AND TRADEMARK OFFICE
CERTIFICATE OF CORRECTION

PATENT NO. : 4,708,287
DATED : 11/24/87
INVENTOR(S) : Jan Bauke De Wit

It is certified that error appears in the above-identified patent and that said Letters Patent is hereby corrected as shown below:

Title page Item 73, --Nederlandse Centrale Organisatie voor Toegepastnatuurwetenschappelijk Onderzoek --.

Col. 1, line 18, "or" should read --of--;

Col. 2, line 31, "transducers" should read --transducer--;

Col. 3, line 5, "shows" should read --show--;

Col. 3, line 42, "or" should read --of--;

Col. 5, line 13, "shoss" should read --shows--;

Col. 5, line 16, "tot" should read --to--;

Col. 5, line 54, "purposed" should read --purpose--; and

Col. 7, line 36, before "flow" insert --mass--.

Signed and Sealed this

Twenty-fourth Day of May, 1988

Attest:

DONALD J. QUIGG

*Attesting Officer*  *Commissioner of Patents and Trademarks*